(12) United States Patent
Otaki et al.

(10) Patent No.: US 12,374,145 B2
(45) Date of Patent: Jul. 29, 2025

(54) DOCUMENT REVIEW ASSISTANCE METHOD, DOCUMENT REVIEW ASSISTANCE SYSTEM, AND NON-TRANSITORY COMPUTER READABLE MEDIUM

(71) Applicant: Hitachi, Ltd., Tokyo (JP)

(72) Inventors: Hiroko Otaki, Tokyo (JP); Kunihiko Kido, Tokyo (JP)

(73) Assignee: HITACHI, LTD., Tokyo (JP)

( * ) Notice: Subject to any disclaimer, the term of this patent is extended or adjusted under 35 U.S.C. 154(b) by 338 days.

(21) Appl. No.: 18/080,221

(22) Filed: Dec. 13, 2022

(65) Prior Publication Data

US 2023/0206673 A1 Jun. 29, 2023

(30) Foreign Application Priority Data

Dec. 24, 2021 (JP) ................................ 2021-210333

(51) Int. Cl.
*G06V 30/413* (2022.01)
*G06V 30/19* (2022.01)

(52) U.S. Cl.
CPC ...... *G06V 30/413* (2022.01); *G06V 30/19107* (2022.01)

(58) Field of Classification Search
None
See application file for complete search history.

(56) References Cited

U.S. PATENT DOCUMENTS

2019/0197105 A1* 6/2019 Tagra ...................... G06F 40/30
2021/0342399 A1* 11/2021 Sisto ................. G06F 16/90332

FOREIGN PATENT DOCUMENTS

JP 2020-140435 A 9/2020

* cited by examiner

*Primary Examiner* — Andrew H Lam
(74) *Attorney, Agent, or Firm* — MATTINGLY & MALUR, PC (57) ABSTRACT

In screening of documents based on a similarity between keywords, it is difficult to exclude documents having similar background but different conclusions. In a document review assistance method executed by a computer system, a storage unit stores data on a plurality of documents, and the document review assistance method includes: a step of creating, by a control unit, a sentence vector based on a sentence included in the plurality of documents; a step of classifying, by the control unit, the plurality of documents into a plurality of clusters based on the created sentence vector; a step of specifying, by the control unit, a subgraph on a network of a word in a first document set included in at least one of the clusters; and a step of controlling, by the control unit, the creation of the sentence vector based on the specified subgraph.

11 Claims, 8 Drawing Sheets

FIG. 3
CALCULATION OF SENTENCE VECTOR

FIG. 5
TWO-TERM RELATION DATA

| RELATION ID | RELATION TYPE | SUBJECT NODE | SUBJECT TYPE | OBJECT NODE | OBJECT TYPE | DOCUMENT ID |
|---|---|---|---|---|---|---|
| S0001 | associate | NOAC | test | CVEs | test | L001 |
| S0002 | associate | Metabolic syndrome | Disease and Symptom | bladder cancer | Disease and Symptom | L002 |
| S0003 | associate | NAFLD | Disease and Symptom | bladder cancer | Disease and Symptom | L003 |
| S0004 | not_associate | liver disease | Disease and Symptom | TSH elevation | Disease and Symptom | L004 |
| S0005 | may_associate | NAFLD | Disease and Symptom | Iph | test | L005 |
| S0006 | not_associate | liver fat | Disease and Symptom | CKD | Disease and Symptom | L006 |
| S0007 | not_associate | metabolic liver inflammation | Disease and Symptom | CETP-related outcomes | Disease and Symptom | L007 |
| S0008 | correlate | AHI | test | liver inflammation | Disease and Symptom | L008 |
| S0009 | prevent | NAFLD | Disease and Symptom | AF | Disease and Symptom | L009 |
| S0010 | associate | NAFLD | Disease and Symptom | mortality | test | L010 |
| : | : | : | : | : | : | : |

FIG. 6

ADOPTION AND NON-ADOPTION DATA

FIG. 7

TWO-TERM RELATION PATTERN DATA

| PATTERN ID | RELATION TYPE | SUBJECT NODE | SUBJECT TYPE | OBJECT NODE | OBJECT TYPE | RATIO |
|---|---|---|---|---|---|---|
| P001 | not_associate | NAFLD | Disease and Symptom | * | Disease and Symptom | 0.3 |
| P002 | may_associate | NAFLD | Disease and Symptom | lph | test | 0.5 |
| P003 | correlate | NAFLD | Disease and Symptom | * | test | 0.7 |
| : | : | : | : | : | : | : |
|  | prevent | NAFLD | Disease and Symptom | * | Disease and Symptom | 1.5 |
|  | : | : | : | : | : | : |

FIG. 8

DOCUMENT REVIEW ASSISTANCE METHOD, DOCUMENT REVIEW ASSISTANCE SYSTEM, AND NON-TRANSITORY COMPUTER READABLE MEDIUM

CLAIM OF PRIORITY

The present application claims priority from Japanese patent application JP 2021-210333 filed on Dec. 24, 2021, the content of which is hereby incorporated by reference into this application.

BACKGROUND OF THE INVENTION

1. Field of the Invention

The present invention relates to a technique for assisting document review.

2. Description of Related Art

In order to plan a clinical trial of a drug, systematic review is indispensable in which a document related to past similar drugs is studied without omission, and research data with high quality is examined and evaluated. In the systematic review, for example, a paper at an appropriate time is searched in a medical paper database, a result thereof is screened in two stages, and an appropriate paper is selected for the basis of a description related to a specific clinical question. For example, a paper is selected according to contents of a summary of the paper in a primary screening, the paper is classified according to the contents in a secondary screening, further selected, and is determined to be adopted or not adopted. In order to prevent an important paper from being overlooked, a large number of documents have to be studied, and thus a burden on a person is large.

For example, there is a technique described in JP2020-140435A (PTL 1) as a technique for assisting document review. PTL 1 discloses "an information search system for searching for a sentence matching a search request includes: a sentence set receiving unit that receives a sentence set including a plurality of sentences; a user search request receiving unit that receives the search request from a user; a word vector converting unit that converts each of the sentences and the search request into a word vector; a sentence vector converting unit that respectively changes a word vector derived from the sentence and a word vector derived from the search request to a sentence vector by a trained neural network; a similarity calculating unit that calculates a degree of similarity between the sentence vector derived from the sentence and the sentence vector derived from the search request; and a search result presenting unit that presents a degree of similarity between the sentence and the search request".

CITATION LIST

Patent Literature

PTL 1: JP2020-140435A

SUMMARY OF THE INVENTION

In the technique described in PTL 1, a document whose context is similar to that of a document determined to be adopted (a document in which an appearing keyword is similar) is determined by a similarity between keyword vectors of the document, and thus extraction of a next document to be read is more efficient.

However, in a document whose research background is similar to a desired document, the fact that final conclusions are different from each other or research purposes are different from each other may be a factor for determining that the document is unnecessary. Even in such a case, when keywords are similar to each other due to the similar background, such documents cannot be excluded based on the similarity between the keywords, and it is difficult to narrow down efficiently.

In order to solve at least one of the above-described problems, in a typical example of the invention disclosed in the present application, a document review assistance method executed by a computer system including a control unit and a storage unit includes: a first step of creating, by the control unit, a sentence vector based on a sentence included in a plurality of acquired documents; a second step of classifying, by the control unit, the plurality of documents into a plurality of clusters based on the created sentence vector; a third step of specifying, by the control unit, a subgraph on a network of a word in a first document set included in at least one of the clusters; and a fourth step of controlling, by the control unit, the creation of the sentence vector based on the specified subgraph.

According to one aspect of the invention, by controlling vectorization of a sentence included in a document, the document can be efficiently narrowed down. Problems, configurations, and effects other than those described above will be clarified with the following description of an embodiment.

DESCRIPTION OF EMBODIMENTS

Hereinafter, an embodiment of the invention will be described with reference to the drawings.

Figure 1:
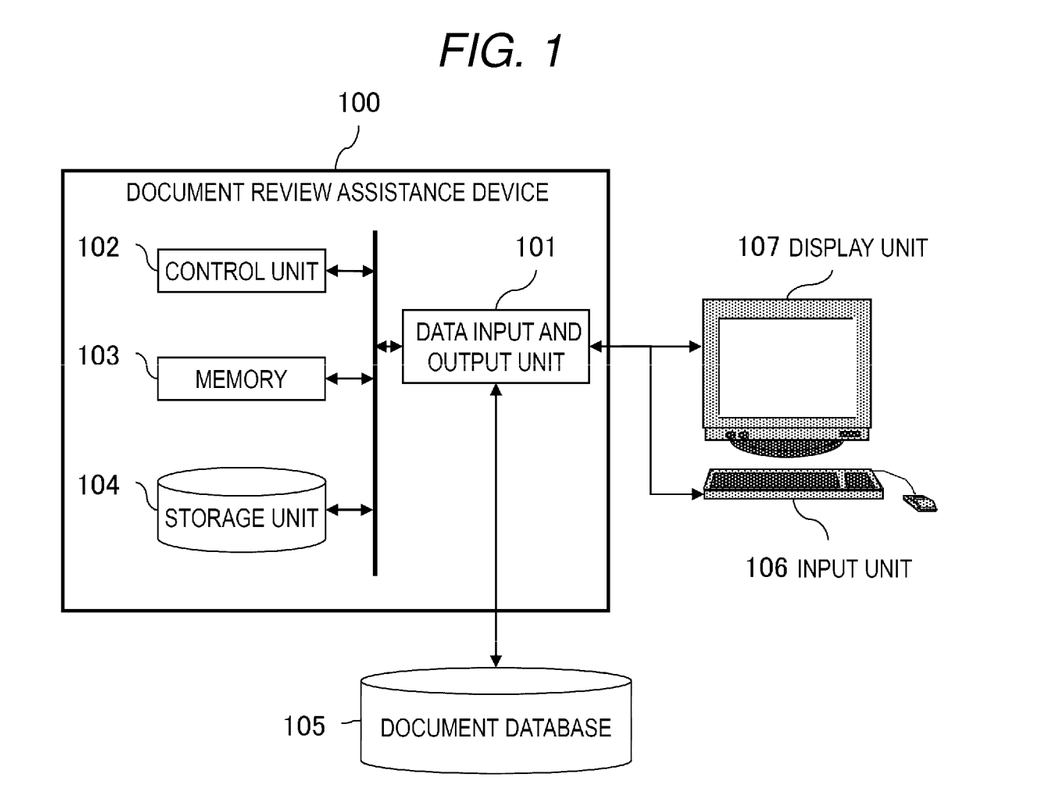
FIG. 1 is a block diagram showing an example of a configuration of a document review assistance device according to a first embodiment of the invention.

FIG. 1 is a block diagram showing an example of a configuration of a document review assistance device 100 according to a first embodiment of the invention.

The document review assistance device 100 is a computer system that includes a data input and output unit 101, a control unit 102, a memory 103, and a storage unit 104.

The data input and output unit 101 may include a communication interface that is connected to a network and communicates with an information system on the network, an external device interface to which an external device is connected, and the like. In the present embodiment, the data input and output unit 101 communicates with a document database 105 via the network. The document database 105 is, for example, a medical paper database such as "PubMed". In addition, for example, an input unit 106 such as a keyboard and a mouse, and a display unit 107 such as an image display device that serve as external devices are connected to the data input and output unit 101.

The control unit 102 is a central processing unit (CPU) that executes a program stored in the memory 103. A process of the document review assistance device 100 to be described later is actually executed by the control unit 102 according to the program stored in the memory 103.

The memory 103 is, for example, a storage device such as a dynamic random access memory (DRAM), and stores the program executed by the control unit 102, data referred to by the process of the control unit 102, data generated by the process of the control unit 102, and the like.

Figure 2:
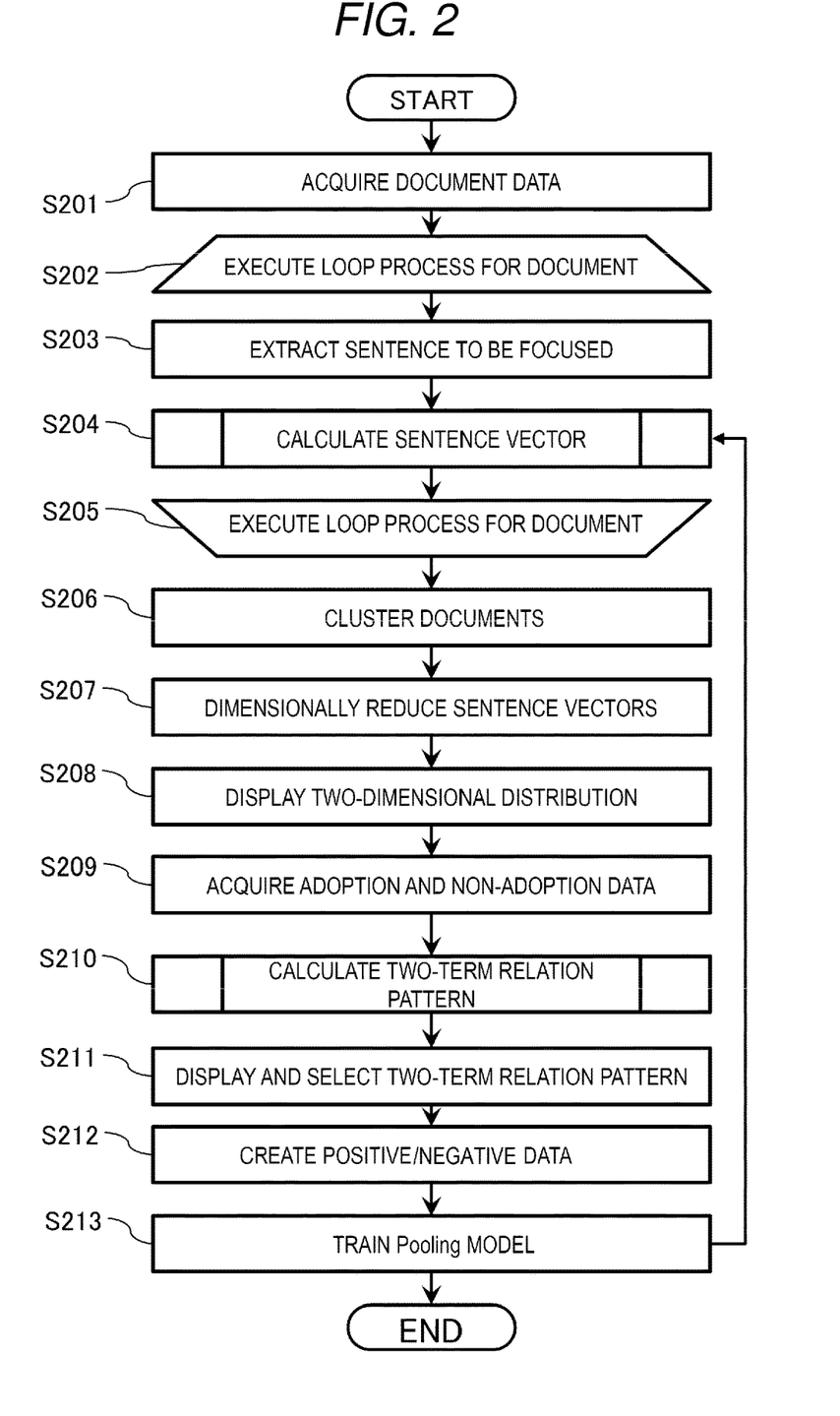
FIG. 2 is a flowchart illustrating an example of a process executed by the document review assistance device according to the first embodiment of the invention.

The storage unit 104 is a storage device such as a hard disk drive (HDD) or a solid state drive (SSD), and can store the above-described program, data, and the like. For example, the program may be stored in the storage unit 104, and at least a part of the program may be stored in the memory 103 as necessary. In addition, among data included in the document database 105, at least a part of the data to be processed in the document review assistance device 100 may be stored in the storage unit 104 as necessary. FIG. 2 is a flowchart illustrating an example of the process executed by the document review assistance device 100 according to the first embodiment of the invention.

First, the document review assistance device 100 acquires document data (step S201). For example, the document review assistance device 100 may acquire document data obtained by performing primary screening such as a simple keyword search from the document database 105. The acquired data may be stored in the storage unit 104.

Next, the document review assistance device 100 executes a loop process of steps S202 to S205 for each of the acquired documents. Specifically, the document review assistance device 100 extracts a sentence to be focused from each document (step S203). A method for extracting a sentence to be focused is not limited, and in one example, a title, a sentence including a target expression, a conclusion sentence, and the like in which necessary information is included may be extracted from the viewpoint of screening. At this time, for example, a sentence including expressions representing targets such as "aim", "perform", "examine", "analyze", and "estimate" may be extracted as the sentence including the target expression. In addition, for example, a sentence including "conclusion", or a sentence at the end of a document may be extracted as the conclusion sentence.

Next, the document review assistance device 100 calculates a sentence vector for the extracted sentence (step S204). At this time, the document review assistance device 100 uses a pooling model. When the loop of steps S202 to S205 is first executed, the pooling model including early parameters prepared in advance is used. The calculation of the sentence vector using the pooling model will be described later with reference to FIG. 3. By executing the processes of step S203 and S204 for all the acquired documents, sentence vectors of all the acquired documents are calculated.

Next, the document review assistance device 100 clusters the acquired documents based on the calculated sentence vector (step S206). A specific method of clustering is not limited, and any method such as a well-known method can be adopted, and thus a detailed description thereof is omitted. Further, the document review assistance device 100 dimensionally reduces the sentence vectors (step S207). Since well-known main constituent analysis or the like can be applied to the clustering, a detailed description thereof is omitted.

Next, the document review assistance device 100 displays a two-dimensional distribution of the sentence vectors of the clustered documents (step S208). An example of the display will be described later with reference to FIG. 8.

Next, the document review assistance device 100 acquires adoption and non-adoption data (step S209). For example, a user who operates the document review assistance device 100 may read some documents belonging to any cluster, may determine whether to adopt or not to adopt each document, and may input a determination result to the document review assistance device 100. An example of the adoption and non-adoption data acquired in this way will be described later with reference to FIG. 6.

Next, the document review assistance device 100 calculates a two-term relation pattern that appears in a sentence extracted as a sentence to be focused from the document in which the adoption and non-adoption data are acquired (step S210). The calculation of the two-term relation pattern will be described later with reference to FIG. 4.

Next, the document review assistance device 100 displays the two-term relation pattern, and accepts selection of the two-term relation pattern (step S211). Examples of the display and selection will be described later with reference to FIG. 8.

Next, the document review assistance device 100 creates positive/negative data obtained by classifying the documents into positive or negative in accordance with the selection received in step S211 (step S212). At this time, the document to be classified may be all documents acquired in step S201, or may be all documents belonging to the cluster which is determined to be adopted or not adopted in step S209 among the clusters generated in step S206. Accordingly, the documents that are not read by the user can also be classified into positive or negative and can be used for training of the pooling model to be described later, and an accuracy of classification of the documents based on the sentence vector can be improved.

Specifically, the document review assistance device 100 classifies, for example, a document in which a two-term relation pattern classified into positive appears in a positive set (that is, an adoption document side), and classifies a document in which a two-term relation pattern classified into negative appears in a negative set (that is, a non-adoption document side). When both a two-term relation pattern classified into positive and a two-term relation pattern classified into negative appear in one document, the document may be classified into the positive set or the negative set based on a predetermined criterion. For example, the document review assistance device 100 may perform classification based on a two-term relation pattern appearing in a sentence having a high degree of importance, such as classifying a document based on a two-term relation pattern appearing in a conclusion sentence of the document. Alternatively, the document review assistance device 100 may perform classification based on the number of appearances of each of the two-term relation patterns, or may perform classification based on a degree of importance (to be described later) of the appearing two-term relation pattern.

Next, the document review assistance device 100 uses the positive/negative data generated in step S212 to train a model for calculating the sentence vector (step S213). For example, when two sentences of a sentence A and a sentence B are both sentences of an adoption document, the document review assistance device 100 assigns weights to respective vectors of respective tokens of the respective sentences (vectorization of the tokens of the sentences will be described later with reference to FIG. 3). At this time, since the two sentences are the sentences of the adoption document, the weights are trained such that the vectors are close to each other. The same applies to a case in which the two sentences are sentences of a non-adoption document. On the other hand, when one of the two sentences is the sentence of the adoption document and the other sentence is the sentence of the non-adoption document, the weights are trained such that the vectors are distant from each other. A model is accompanied by adjustment of the weights, and may be the Pooling model or adjustment of weights at other points. Hereinafter, the model will be described later as the Pooling model.

Thereafter, the process returns to step S204, and the document assistance device 100 calculates the sentence vector of each document by using the trained pooling model. Further, the document review assistance device 100 executes the processes of step S206 and the subsequent steps. By clustering the sentence vectors calculated using the pooling model trained in step S213, documents supposed to be classified into the positive are likely to be classified into the same cluster and documents supposed to be classified into the negative are likely to be classified into the same cluster, and a document supposed to be classified into the positive and a document supposed to be classified into the negative are likely to be classified into different clusters. Accordingly, an accuracy of narrowing down the document is improved.

As compared with a case in which the documents are classified using only positive and negative determination results based on the two-term relation pattern, by clustering the sentence vectors based on the pooling model trained as described above, it is possible to determine a document having a close meaning of words even if a syntax is different as a document having a high similarity.

The document review assistance device 100 may repeatedly execute, until a predetermined condition is satisfied, a process of training the pooling model by executing steps S206 to S213 and calculating the sentence vector of each document in step S203 using the trained pooling model. The predetermined condition may be, for example, a condition that a ratio of the documents classified into the negative to the all documents classified into the positive/negative data created in step S212 is smaller than a predetermined threshold value, or may be, for example, a condition that it is determined that the training is converged, such as a case in which the ratio of the documents classified into the negative does not change even though the training is repeated. In this case, when the predetermined condition is satisfied, the process illustrated in FIG. 2 ends.

Figure 3:
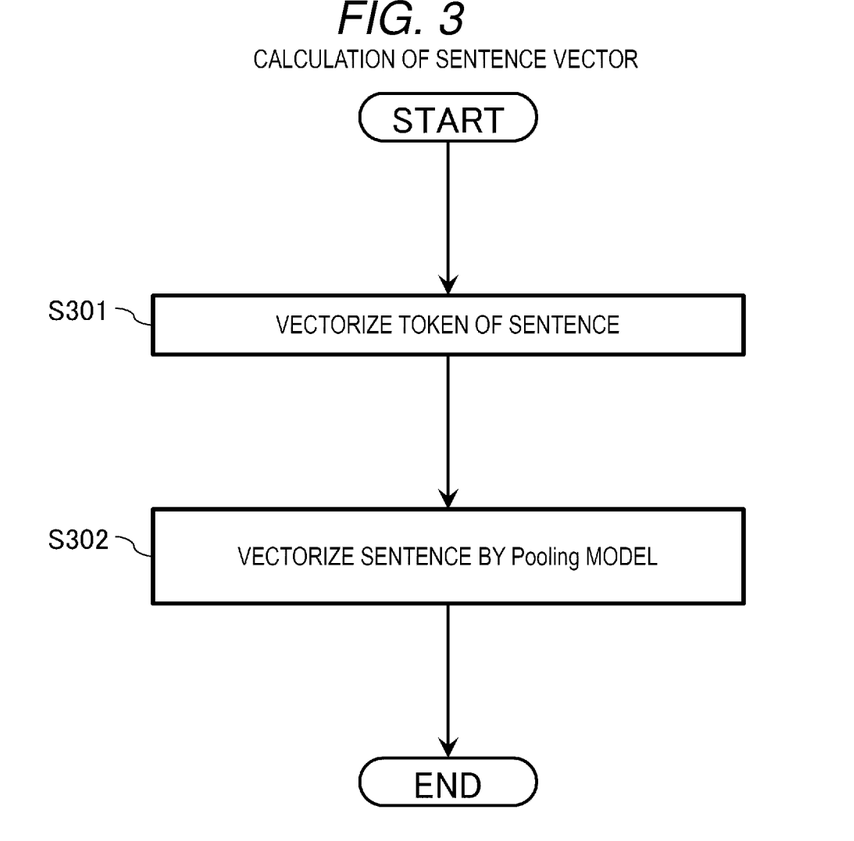
FIG. 3 is a flowchart illustrating an example of a process of calculating a sentence vector by the document review assistance device according to the first embodiment of the invention.

FIG. 3 is a flowchart illustrating an example of a process of calculating a sentence vector by the document review assistance device 100 according to the first embodiment of the invention.

First, the document review assistance device 100 vectorizes a token of an input sentence (step S301). For example, the document review assistance device 100 may convert a word of the input sentence into a vector using a predetermined natural language processing model (for example, BERT: Bidirectional Encoder Representations from Transformers).

Next, the document review assistance device 100 vectorizes the sentence by the pooling model (step S302). For example, the document review assistance device 100 may calculate, as the sentence vector, a sum of values which are obtained by multiplying the vectors obtained in step S301 by the weight of the pooling model.

When the process illustrated in FIG. 3 is executed in step S204 while the loop of steps S202 to S205 is executed for a first time, a predetermined initial value is used as the weight of the pooling, and when the process illustrated in FIG. 3 is executed after the training of step S213 is performed, the weight of the pooling trained in step S213 is used.

Thus, the process of calculating the sentence vector ends.

Figure 4:
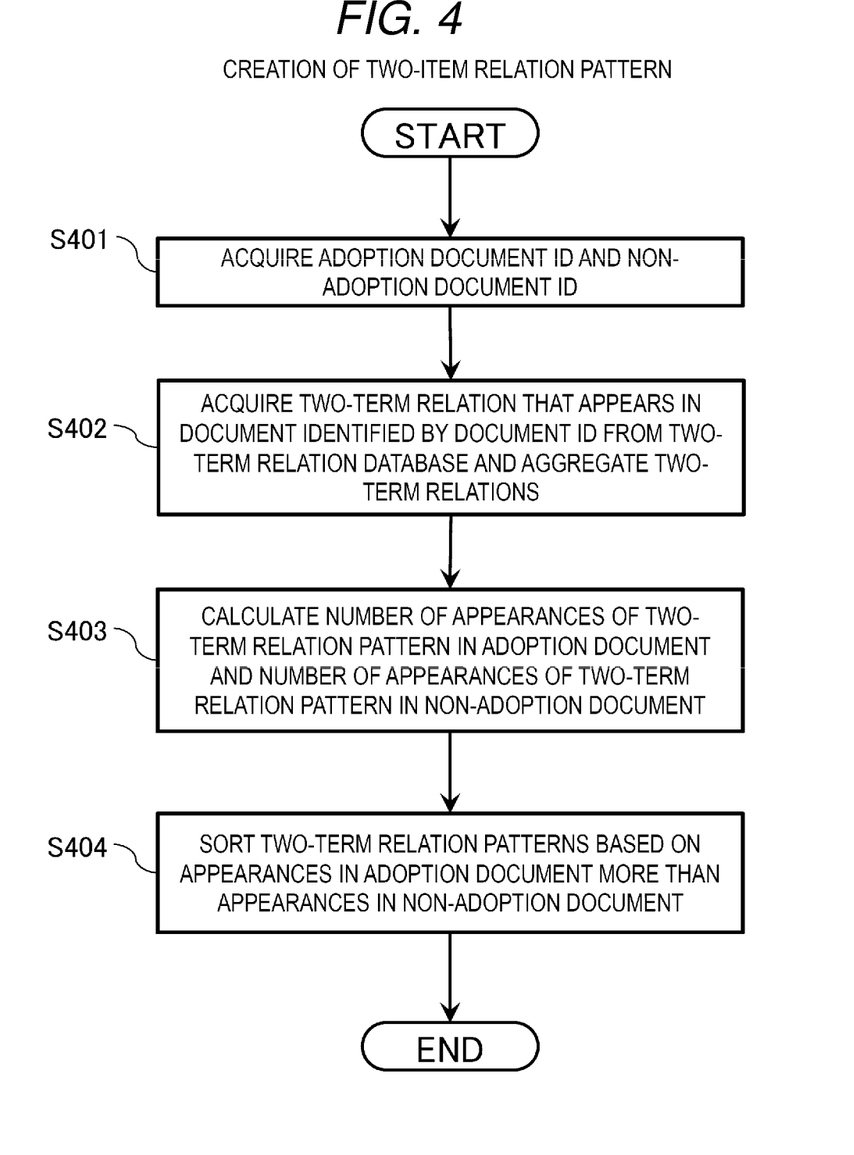
FIG. 4 is a flowchart illustrating an example of a process of creating a two-term relation pattern by the document review assistance device according to the first embodiment of the invention.

FIG. 4 is a flowchart illustrating an example of a process of creating a two-term relation pattern by the document review assistance device 100 according to the first embodiment of the invention.

First, the document review assistance device 100 acquires an ID of a document determined to be adopted (also referred to as an adoption document) and an ID of a document determined to be not adopted (also referred to as a non-adoption document) based on the adoption and non-adoption data acquired in step S209 (step S401).

Next, the document review assistance device 100 acquires a two-term relation that appears in the document identified by the document ID acquired in step S401 from a two-term relation database, and aggregates two-term relations. An example of two-term relation data thus aggregated will be described later with reference to FIG. 5. Concepts of two words, a type of each concept, and a two-term relation indicating a relation therebetween are stored, as information indicating a network of a word appearing in a document, in the two-term relation database, and among the information, the two-term relation that appears in the document identified by the document ID acquired in step S401 is specified as a subgraph.

Next, the document review assistance device 100 generates two-term relation patterns based on the two-term relations aggregated in step S402, and calculates the number of appearances of each of the two-term relation patterns in the adoption document and the number of appearances of each of the two-term relation patterns in the non-adoption document (step S403). Here, the term "two-term relation pattern" may be a two-term relation itself, or may be a pattern in which a plurality of two-term relations are aggregated by setting a value of any item that specifies the two-term relation as any value (in other words, a pattern in which a plurality of two-term relations which are different in values of the items that specify the two-term relation are aggregated). An example of the two-term relation pattern will be described later with reference to FIG. 7.

Next, the document review assistance device 100 sorts the two-term relation patterns based on a tendency that the number of appearances in the adoption document is larger than the number of appearances in the non-adoption document (step S404). For example, the document review assistance device 100 may calculate, for each of the two-term relation patterns, a ratio of the number of appearances in the adoption document to the number of appearances in the non-adoption document, and may rearrange the two-term relation patterns in descending order of the ratio.

The process of creating the two-term relation patterns thus ends.

Figure 5:
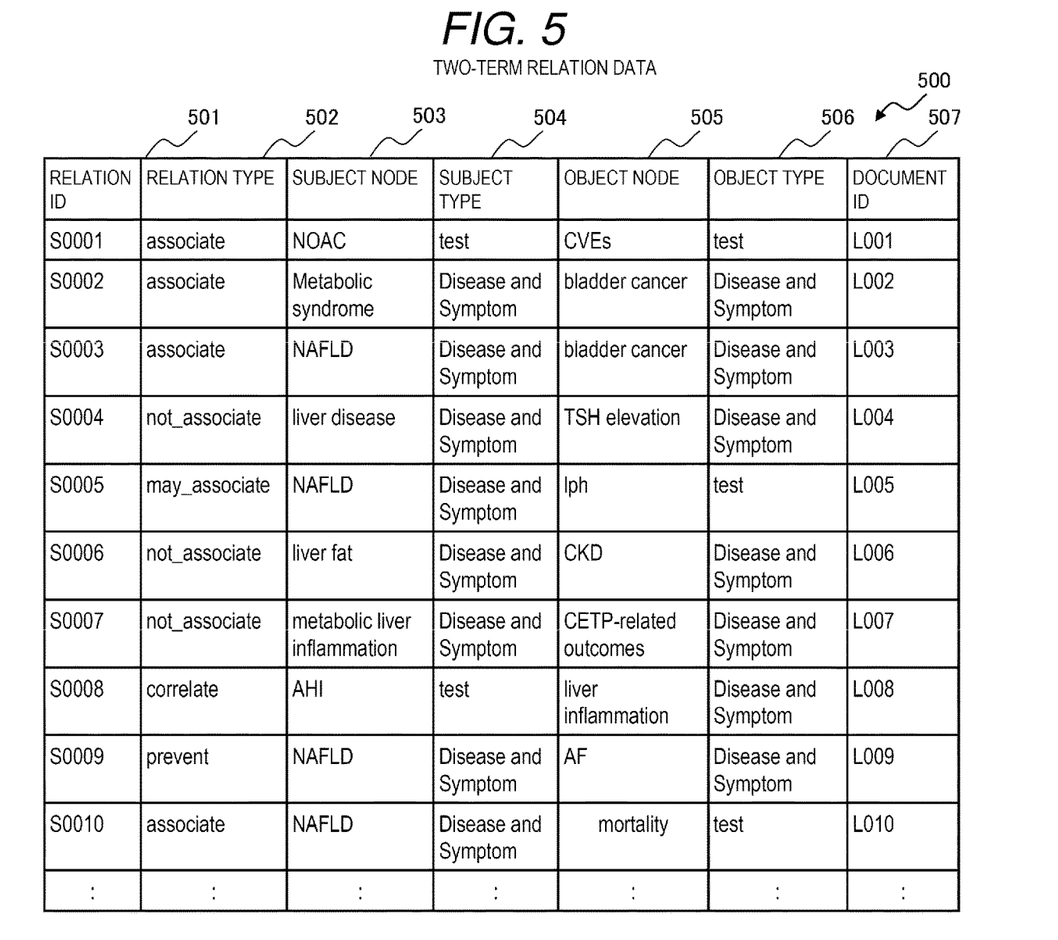
FIG. 5 is a diagram illustrating an example of two-term relation data stored by the document review assistance device according to the first embodiment of the invention.

FIG. 5 is a diagram illustrating the example of the two-term relation data stored by the document review assistance device 100 according to the first embodiment of the invention.

Two-term relation data 500 illustrated in FIG. 5 is stored in, for example, the storage unit 104 of the document review assistance device 100, and at least a part of copies may be stored in the memory 103 as necessary in the process of the control unit 102, and reference, update, and the like may be performed.

The two-term relation data 500 includes a relation ID 501, a relation type 502, a subject node 503, a subject type 504, an object node 505, an object type 506, and a document ID 507.

In the embodiment, an example in which a two-term relation indicates a relation between a subject and an object in a sentence will be described. The relation ID 501 is information for identifying a two-term relation. The relation type 502 indicates a type of the two-term relation. The subject node 503 indicates a word corresponding to a subject of the two-term relation. The subject type 504 indicates a type of the word corresponding to the subject of the two-term relation. The object node 505 indicates a word corresponding to an object of the two-term relation. The object type 506 indicates a type of the word corresponding to the object of the two-term relation. The document ID 507 is information for identifying a document in which the two-term relation appears.

For example, information on a two-term relation whose relation ID is "S0001" is stored in a first row of the two-term relation data 500 in FIG. 5. The information indicates that the two-term relation whose type is "associate" between a subject "NOAC" whose type is "test" and an object "CVEs" whose type is "test" appears in a document whose document ID is "L001".

In an example in FIG. 5, one two-term relation corresponds to one document, but actually, a plurality of two-term relations may appear in one document, and one two-term relation may appear in a plurality of documents.

Figure 6:
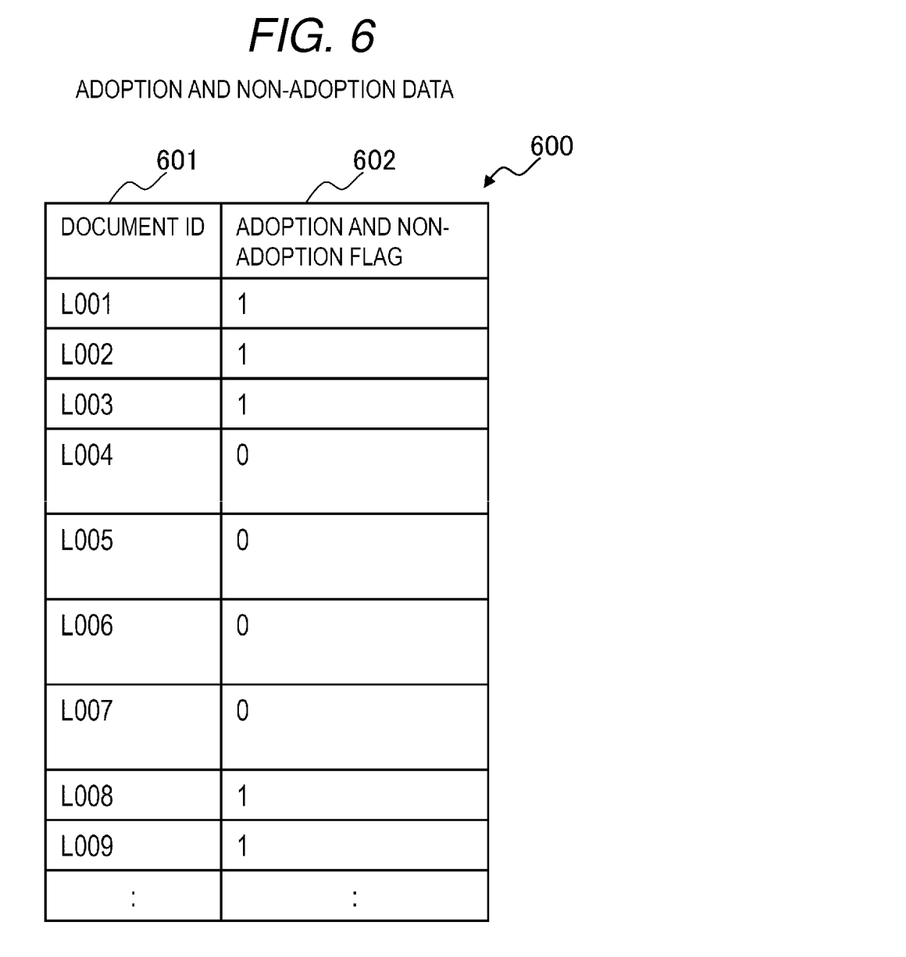
FIG. 6 is a diagram illustrating an example of adoption and non-adoption data stored by the document review assistance device according to the first embodiment of the invention.

FIG. 6 is a diagram illustrating an example of adoption and non-adoption data stored by the document review assistance device 100 according to the first embodiment of the invention.

Adoption and non-adoption data 600 illustrated in FIG. 6 is stored in, for example, the storage unit 104 of the document review assistance device 100, and at least a part of copies may be stored in the memory 103 as necessary in the process of the control unit 102, and reference, update, and the like may be performed.

The adoption and non-adoption data 600 includes a document ID 601 and an adoption and non-adoption flag 602. The document ID 601 is information for identifying a document. The adoption and non-adoption flag 602 indicates a result that the user reads each document and determines that the document is adopted or not adopted. In an example in FIG. 6, documents with document IDs "L001" to "L003", "L008", and "L009" are determined as adopted, and documents with document IDs "L004" to "L007" are determined as not adopted.

Figure 7:
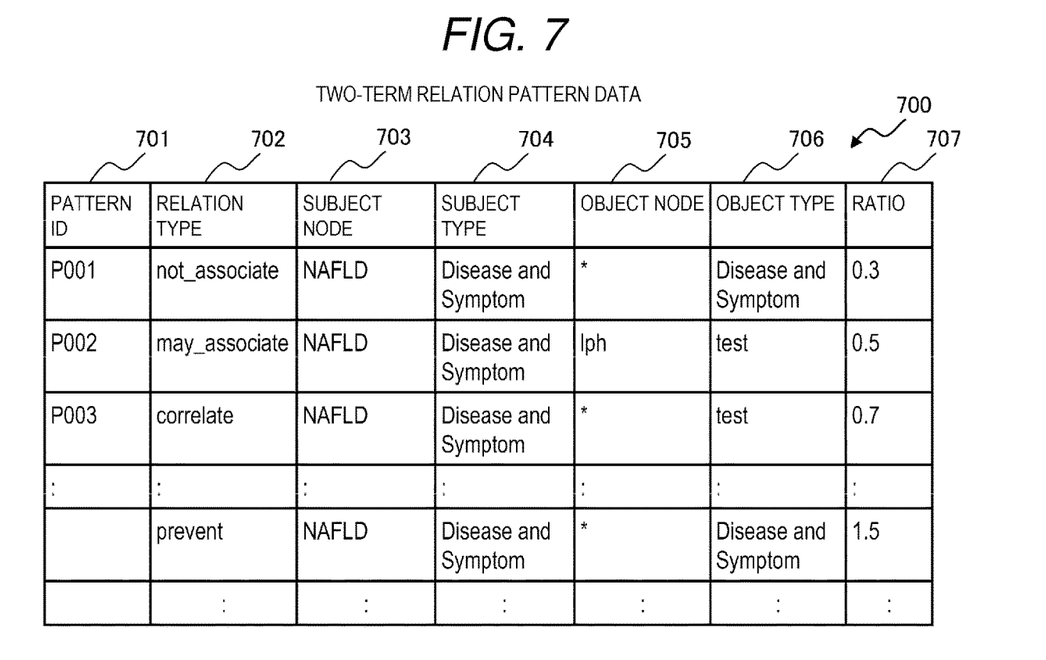
FIG. 7 is a diagram illustrating an example of two-term relation pattern data stored by the document review assistance device according to the first embodiment of the invention.

FIG. 7 is a diagram illustrating an example of two-term relation pattern data stored by the document review assistance device 100 according to the first embodiment of the invention.

Two-term relation pattern data 700 illustrated in FIG. 7 is stored, for example, in the storage unit 104 of the document review assistance device 100, and at least a part of copies may be stored in the memory 103 as necessary in the process of the control unit 102, and reference, update, and the like may be performed.

The two-term relation pattern data 700 includes a pattern ID 701, a relation type 702, a subject node 703, a subject type 704, an object node 705, an object type 706, and a ratio 707.

The pattern ID 701 is information for identifying a two-term relation pattern. The relation type 702 indicates a type of the two-term relation pattern. The subject node 703 indicates a word corresponding to a subject of the two-term relation pattern. The subject type 704 indicates a type of the word corresponding to the subject of the two-term relation pattern. The object node 705 indicates a word corresponding to an object of the two-term relation pattern. The object type 706 indicates type of the word corresponding to the object of the two-term relation pattern. The ratio 707 indicates a ratio of the number of appearances of the two-term relation pattern in an adoption document to the number of appearances of the two-term relation pattern in a non-adoption document.

For example, information on a two-term relation pattern whose pattern ID is "P001" is stored in a first row of the two-term relation pattern data 700 in FIG. 7. In the example, the information indicates that a two-term relation pattern whose type is "not associate" between a subject "NAFLD" whose type is "Disease and Symptom" and any object whose type is "Disease and Symptom" appears in both the non-adoption document and the adoption document, and a ratio of the number of appearances in the adoption document to the number of appearances in the non-adoption document is "0.3".

In an example of the first row, a value of the object node 705 is a wild card (*). The information indicates that a two-term relation whose type is "not associate" between the subject "NAFLD" whose type is "Disease and Symptom" and an object whose type is "Disease and Symptom" corresponds to the two-term relation pattern whose pattern ID is "P001" regardless of what the object itself is. Accordingly, by setting at least one value of the items that specify the two-term relation as any value, a plurality of two-term relations may be aggregated into one two-term relation pattern. Alternatively, as in an example of a second row of the two-term relation pattern data 700 illustrated in FIG. 7, one two-term relation may correspond to one two-term relation pattern as it is.

Figure 8:
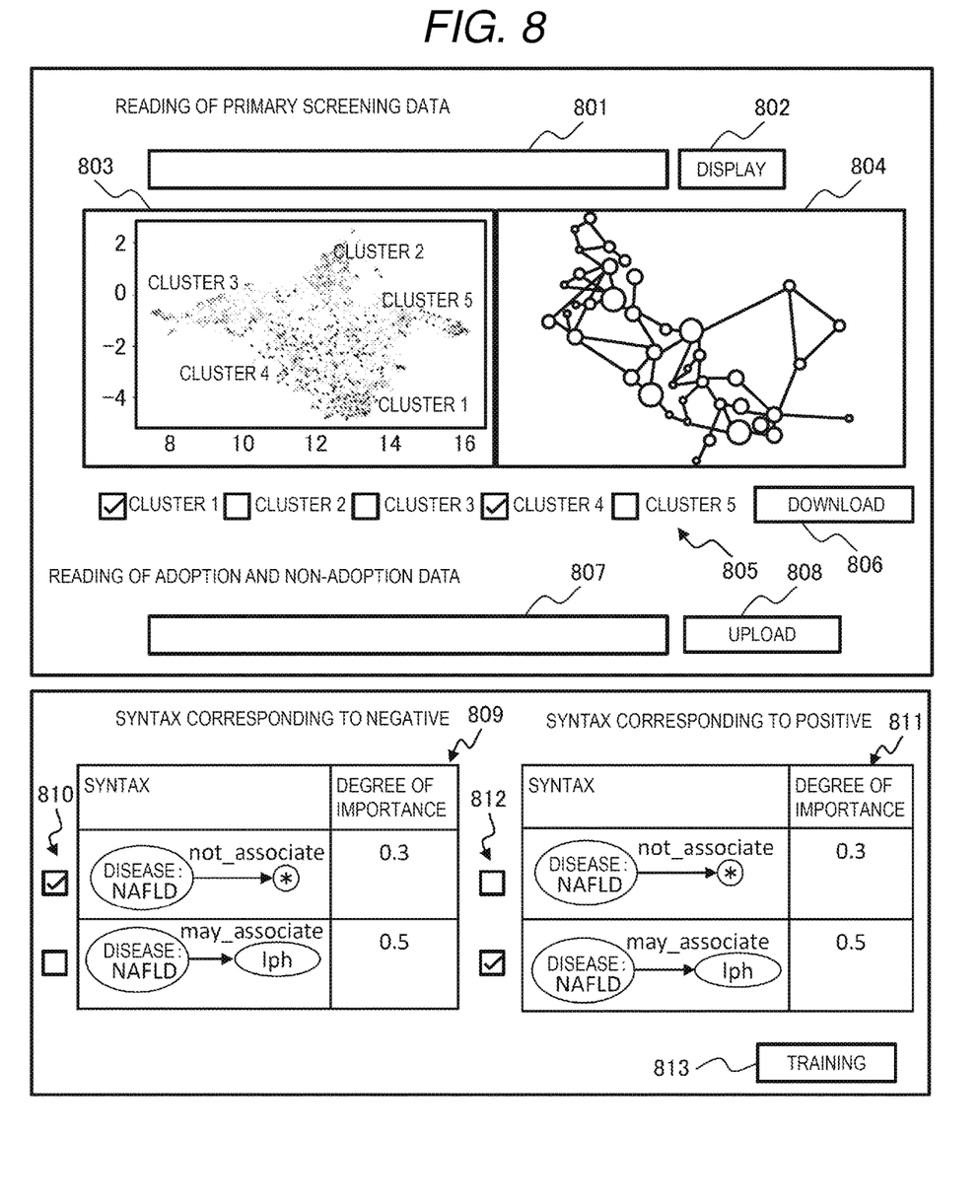
FIG. 8 is a diagram illustrating an example of a screen displayed by the document review assistance device according to the first embodiment of the invention.

FIG. 8 is a diagram illustrating an example of a screen displayed by the document review assistance device 100 according to the first embodiment of the invention.

When the user inputs information specifying document data to be read to a primary screening data input unit 801 and operates a display button 802, the specified primary screened document data is read (step S201), and steps S201 to S208 are executed on the read document data. A two-dimensional distribution of a dimensionally reduced sentence vector is displayed on a sentence vector display unit 803, and a cluster obtained result of the clustering (step S206) is displayed.

When the user inputs a check to a cluster selection unit 805 to select at least one cluster, and operates a download button 806, document data belonging to the selected cluster is downloaded. The user reads some pieces of the document data, determines whether the document data is adopted or not adopted, and records a determination result as the adoption and non-adoption data 600 in the document review assistance device 100.

When the user inputs information specifying the generated adoption and non-adoption data 600 to an adoption and non-adoption data input unit 807 and operates an upload button 808, the specified adoption and non-adoption data 600 is uploaded. The document review assistance device 100 calculates a two-term relation pattern for target document data (for example, all document data obtained by primary screening or all document data included in a specified cluster) based on the uploaded adoption and non-adoption data 600 (step S210), and displays the calculated two-term relation pattern (step S211).

For example, the calculated two-term relation or two-term relation pattern is displayed in a two-term relation display unit 804. Although a display method is not limited, in an example in FIG. 8, a graph in which nodes of a two-term relation (for example, a subject or an object) are represented by circles and an edge corresponding to the relation between the nodes is represented by a line connecting two circles is displayed. For example, the number of appearances of a word corresponding to the node may be represented by a size of the circle, and an intensity of a relation of words corresponding to the nodes may be represented by a distance between the circles connected by the line. The intensity of the relation may be based on the number of appearances, or may be based on a type of the words indicating the relation. In addition, a category of a concept corresponding to each node (for example, a subject type and an object type) may be represented by a color of a circle. Although omitted in FIG. 8, the word of the node corresponding to the circle may be displayed on the graph. Alternatively, a two-term relation may be displayed by a method different from that described above.

A negative syntax display unit 809 displays a list of combinations of syntaxes specified by values of the relation type 702, the subject node 703, the subject type 704, the object node 705, and the object type 706 of the generated two-term relation pattern and a degree of importance of each of the syntaxes. Here, the degree of importance of the syntax corresponds to, for example, the ratio 707.

A positive syntax display unit 811 may display the same list as the list displayed in the negative syntax display unit 809. The syntaxes may be displayed in the negative syntax display unit 809 in ascending order of the degree of importance, and the syntaxes may be displayed in the positive syntax display unit 811 in descending order of the degree of importance.

By referring to the negative syntax display unit 809 and checking a check box 810 corresponding to a syntax determined to correspond to negative, the user can select the syntax corresponding to the negative. Similarly, by referring to the positive syntax display unit 811 and checking a check box 812 corresponding to a syntax determined to correspond to positive, the user can select the syntax corresponding to the positive (step S211).

For example, the user may select whether each syntax is positive or negative based on the degree of importance, such as selecting a syntax having a high degree of importance as the syntax corresponding to the positive and selecting a syntax having a low degree of importance as the syntax corresponding to the negative. Alternatively, the user may select whether the syntax is positive or negative based on a content of the syntax.

When the user selects the syntax corresponding to the negative and the syntax corresponding to the positive and operates a training button 813, steps S212 and S213 are executed, and the pooling model is trained.

A function of the document review assistance device 100 may be provided via an application programming interface (API). For example, the screen illustrated in FIG. 8 may be displayed on a terminal device (not shown) connected to the document review assistance device 100 via a network (not shown) connected to the data input and output unit 101. When the user of the terminal device operates an input unit, a check box, a button, and the like in FIG. 8, an operation result may be transmitted to the document review assistance device 100, and the document review assistance device 100 may execute the processes in FIGS. 2 to 4 and transmit a result thereof (for example, information specifying a finally clustered document) to the terminal device.

A system according to the embodiment of the invention may be implemented as follows.

(1) A document review assistance method executed by a computer system including a control unit (for example, control unit 102) and a storage unit (for example, storage unit 104), the document review assistance method including: a first step (for example, S204) of creating, by the control unit, a sentence vector based on a sentence included in a plurality of acquired documents; a second step (for example, S206) of classifying, by the control unit, the plurality of documents into a plurality of clusters based on the created sentence vector; a third step (for example, S209 to S212) of specifying, by the control unit, a subgraph (for example, two-term relation) on a network of a word in a first document set included in at least one of the clusters; and a fourth step (for example, S213) of controlling, by the control unit, the creation of the sentence vector based on the specified subgraph.

Accordingly, by controlling vectorization of a sentence included in a document, the document can be efficiently narrowed down.

(2) According to (1), the subgraph includes information indicating a relation between words (for example, two-term relation) in the network of the word, in the third step, the control unit classifies at least a part of the first document set into a positive set or a negative set in the based on the relation between words included in the specified subgraph, and in the fourth step, the control unit controls, using the positive set and the negative set as training data, the creation of the sentence vector by training a model for creating the sentence vector such that a sentence vector created based on a document belonging to the positive set is close to another sentence vector created based on a document belonging to the positive set, a sentence vector created based on a document belonging to the negative set is close to another sentence vector created based on a document belonging to the negative set, and a sentence vector created based on a document belonging to the positive set is far from a sentence vector created based on a document belonging to the negative set.

Accordingly, by adjusting a model for vectorizing the sentence included in the document, the document can be efficiently narrowed down.

(3) In the fourth step of (2), the control unit trains the model for creating the sentence vector by adjusting a value of a weight included in the model for creating the sentence vector based on classification into the positive set or the negative set.

Accordingly, by adjusting the model for vectorizing the sentence included in the document, the document can be efficiently narrowed down.

(4) According to (3), the information indicating the relation between words includes information (for example, two-term relation pattern data 700) indicating a two-term relation pattern specified by concepts of two words, types of the concepts, and a relation between the two words, the information indicating the relation between words included in the specified subgraph includes information (for example, information input via check box 810 or 812) specifying at least one of a plurality of the two-term relation patterns as positive and specifying at least another of the plurality of two-term relation patterns as negative, and in the third step, the control unit classifies, into the positive set, a document including the two-term relation pattern specified as positive, and classifies, into the negative set, a document including the two-term relation pattern specified as negative.

Accordingly, by controlling the vectorization of the sentence included in the document based on a tendency of appearance of a relation between concepts included in the document, the document can be efficiently narrowed down.

(5) In the third step of (4), the control unit creates at least one of the two-term relation patterns by aggregating a plurality of two-term relations that are different in a value of at least one of the concepts of the two words, the types of the concepts, and the relation between the two words.

Accordingly, since the number of samples corresponding to the patterns is increased, it is easy to compare the number of appearances in an adoption document and the number of appearances in a non-adoption document. In addition, features of the adoption document and the non-adoption document can be easily grasped based on a pattern having versatility.

(6) In the third step of (4), the control unit calculates, based on information specifying a part of the first document set as an adoption document and specifying a part of the first document set other than the adoption document as a non-adoption document, a ratio (for example, degree of importance of negative syntax display unit 809 and positive syntax display unit 811) of the number of appearances of the two-term relation pattern in the adoption document to the number of appearances of the two-term relation pattern in the non-adoption document, and outputs the calculated ratio.

Accordingly, a positive document and a negative document can be easily classified based on the number of appearances of the two-term relation pattern.

(7) According to (6), the information indicating the relation between words included in the specified subgraph includes information specifying, as positive, the two-term relation pattern having a high ratio of the number of appearances in the adoption document to the number of appearances in the non-adoption document, and specifying, as negative, the two-term relation pattern having a low ratio of the number of appearances in the adoption document to the number of appearances in the non-adoption document.

Accordingly, the positive document and the negative document can be appropriately classified based on the number of appearances of the two-term relation pattern.

(8) In the third step of (6), the control unit classifies a document that does not correspond to any one of the adoption document and the non-adoption document among the documents belonging to the first document set into any one of the positive set and the negative set, based on the two-term relation pattern included in the document that does not correspond to any one of the adoption document and the non-adoption document.

Accordingly, a document that is not read by the user is classified into the positive set or the negative set, and an accuracy of the model can be improved using the classified document to create the model.

(9) In the third step of (6), the control unit classifies a document that does not correspond to any one of the adoption document and the non-adoption document among the plurality of documents into any one of the positive set and the negative set, based on the two-term relation pattern included in the document that does not correspond to any one of the adoption document and the non-adoption document.

Accordingly, the document that is not read by the user is classified into the positive set or the negative set, and the accuracy of the model can be improved using the classified document to create the model.

(10) In the first step of (3), the control unit creates the sentence vector by using the model including a predetermined value of the weight, and after the fourth step is executed, the control unit controls the creation of the sentence vector by executing the first step again using the model including a value of the weight adjusted in the fourth step.

Accordingly, by adjusting the model for vectorizing the sentence included in the document, the document can be efficiently narrowed down.

The invention is not limited to the embodiment, and includes various modifications. For example, the embodiment is described in detail for better understanding of the invention, and the invention is not necessarily limited to those including all configurations of the description. In addition, a part of configurations of one embodiment can be replaced with configurations another embodiment.

Alternatively, configurations of one embodiment can be added to configurations of another embodiment. A part of the configurations of each embodiment may be added, deleted, or replaced with another configuration.

The configurations, functions, processing units, processing methods, and the like may be partially or entirely implemented by hardware such as through design using an integrated circuit. In addition, the configurations, functions, and the like may be implemented by software with a processor interpreting and executing a program for implementing the functions. Information such as a program, a table, or a file for implementing the functions can be stored in a storage device such as a non-volatile semiconductor memory, a hard disk drive, and a solid state drive (SSD), or a computer readable non-transitory data storage medium such as an IC card, an SD card, and a DVD.

Control lines and information lines show those considered to be necessary for description, and not all of the control lines and the information lines are necessarily shown on a product. Actually, it may be considered that almost all the configurations are connected to each other.

What is claimed is:

1. A document review assistance method executed by a computer system including a control unit and a storage unit, the document review assistance method comprising:
    a first step of creating, by the control unit, a sentence vector based on a sentence included in a plurality of acquired documents;

a second step of classifying, by the control unit, the plurality of documents into a plurality of clusters based on the created sentence vector;

a third step of specifying, by the control unit, a subgraph on a network of a word in a first document set included in at least one of the clusters; and a fourth step of controlling, by the control unit, the creation of the sentence vector based on the specified subgraph, wherein the subgraph includes information indicating a relation between words in the network of the word, wherein, in the third step, the control unit classifies at least a part of the first document set into a positive set or a negative set based on the relation between words included in the specified subgraph, and wherein, in the fourth step, the control unit controls, using the positive set and the negative set as training data, the creation of the sentence vector by training a model for creating the sentence vector such that a sentence vector created based on a document belonging to the positive set is close to another sentence vector created based on a document belonging to the positive set, a sentence vector created based on a document belonging to the negative set is close to another sentence vector created based on a document belonging to the negative set, and a sentence vector created based on a document belonging to the positive set is far from a sentence vector created based on a document belonging to the negative set.

2. The document review assistance method according to claim 1, wherein
in the fourth step, the control unit trains the model for creating the sentence vector by adjusting a value of a weight included in the model for creating the sentence vector based on classification into the positive set or the negative set.

3. The document review assistance method according to claim 2, wherein
the information indicating the relation between words includes information indicating a two-term relation pattern specified by concepts of two words, types of the concepts, and a relation between the two words,
the information indicating the relation between words included in the specified subgraph includes information specifying at least one of a plurality of the two-term relation patterns as positive and specifying at least another of the plurality of two-term relation patterns as negative, and
in the third step, the control unit classifies, into the positive set, a document including the two-term relation pattern specified as positive, and classifies, into the negative set, a document including the two-term relation pattern specified as negative.

4. The document review assistance method according to claim 2, wherein
in the first step, the control unit creates the sentence vector by using the model including a predetermined value of the weight, and
after the fourth step is executed, the control unit controls the creation of the sentence vector by executing the first step again using the model including a value of the weight adjusted in the fourth step.

5. The document review assistance method according to claim 3, wherein
in the third step, the control unit creates at least one of the two-term relation patterns by aggregating a plurality of two-term relations that are different in a value of at least one of the concepts of the two words, the types of the concepts, and the relation between the two words.

6. The document review assistance method according to claim 3, wherein
in the third step, the control unit calculates, based on information specifying a part of the first document set as an adoption document and specifying a part of the first document set other than the adoption document as a non-adoption document, a ratio of the number of appearances of the two-term relation pattern in the adoption document to the number of appearances of the two-term relation pattern in the non-adoption document, and outputs the calculated ratio.

7. The document review assistance method according to claim 6, wherein
the information indicating the relation between words included in the specified subgraph includes information specifying, as positive, the two-term relation pattern having a high ratio of the number of appearances in the adoption document to the number of appearances in the non-adoption document, and specifying, as negative, the two-term relation pattern having a low ratio of the number of appearances in the adoption document to the number of appearances in the non-adoption document.

8. The document review assistance method according to claim 6, wherein
in the third step, the control unit classifies a document that does not correspond to any one of the adoption document and the non-adoption document among the documents belonging to the first document set into any one of the positive set and the negative set, based on the two-term relation pattern included in the document that does not correspond to any one of the adoption document and the non-adoption document.

9. The document review assistance method according to claim 6, wherein
in the third step, the control unit classifies a document that does not correspond to any one of the adoption document and the non-adoption document among the plurality of documents into any one of the positive set and the negative set, based on the two-term relation pattern included in the document that does not correspond to any one of the adoption document and the non-adoption document.

10. A document review assistance system comprising:
a control unit; and
a storage unit,
wherein the control unit is configured to create a sentence vector based on a sentence included in a plurality of acquired documents,
classify the plurality of documents into a plurality of clusters based on the created sentence vector,
specify a subgraph on a network of a word in a first document set included in at least one of the clusters, and
control the creation of the sentence vector based on the specified subgraph,
wherein the subgraph includes information indicating a relation between words in the network of the word,
wherein, in the third step, the control unit classifies at least a part of the first document set into a positive set or a negative set based on the relation between words included in the specified subgraph, and
wherein, in the fourth step, the control unit controls, using the positive set and the negative set as training data, the creation of the sentence vector by training a model for creating the sentence vector such that a sentence vector created based on a document belonging to the positive set is close to another sentence vector created based on a document belonging to the positive set, a sentence vector created based on a document belonging to the negative set is close to another sentence vector created based on a document belonging to the negative set, and a sentence vector created based on a document belonging to the positive set is far from a sentence vector created based on a document belonging to the negative set.

11. A non-transitory computer readable medium storing a document review assistance program executable by a computer system including a control unit and a storage unit, the document review assistance program causing the computer system to execute steps comprising:

a first step of creating a sentence vector based on a sentence included in a plurality of acquired documents;

a second step of classifying the plurality of documents into a plurality of clusters based on the created sentence vector;

a third step of specifying a subgraph on a network of a word in a first document set included in at least one of the clusters; and a fourth step of controlling the creation of the sentence vector based on the specified subgraph, wherein the subgraph includes information indicating a relation between words in the network of the word, wherein in the third step, the control unit classifies at least a part of the first document set into a positive set or a negative set based on the relation between words included in the specified subgraph, and wherein in the fourth step, the control unit controls, using the positive set and the negative set as training data, the creation of the sentence vector by training a model for creating the sentence vector such that a sentence vector created based on a document belonging to the positive set is close to another sentence vector created based on a document belonging to the positive set, a sentence vector created based on a document belonging to the negative set is close to another sentence vector created based on a document belonging to the negative set, and a sentence vector created based on a document belonging to the positive set is far from a sentence vector created based on a document belonging to the negative set.

* * * * *